Feb. 11, 1947.  R. W. BENFER  2,415,406
FILM DRIVING APPARATUS
Filed March 8, 1944

INVENTOR
R.W. BENFER
BY
J. F. McEneany
ATTORNEY

Patented Feb. 11, 1947

2,415,406

UNITED STATES PATENT OFFICE 2,415,406

FILM DRIVING APPARATUS

Richard W. Benfer, Morristown, N. J., assignor to Western Electric Company, Incorporated, New York, N. Y., a corporation of New York Application March 8, 1944, Serial No. 525,623

3 Claims. (Cl. 271—2.3)

This invention relates to film driving apparatus and more particularly to improvements in such apparatus permitting propulsion of a film strip therethrough in either forward or reverse direction.

It is an object of this invention to provide a reversible film driving apparatus in which equal uniform film speed may be obtained for either direction of travel of the film through the apparatus.

It is a further object of this invention to provide a reversible film driving apparatus in which the sequence of engagement of the film with the driving and guiding elements is the same for either direction of travel of the film.

A feature of the invention resides in a novel arrangement of film driving and guiding elements permitting a method of film threading which places the constant speed film driving sprocket on the take-up side of the film guiding means at the film exposure point for either direction of travel of the film.

Specifically, in accordance with the invention, the film is supported at the exposure point by a rotatable drum. A driving sprocket feeds the film toward and draws the film from the drum. A constant speed sprocket engages the film between the drum and driving sprocket on the take-up side of the drum. This constant speed sprocket is rotated by the driving means in a direction opposite to the direction of rotation of the driving sprocket. The driving means provided is reversible to obtain reversal of the direction of rotation of both the sprockets. By reason of a novel arrangement of the elements of the film propulsion mechanism, a method of film threading is realized in which the film is engaged and driven in the proper direction from the take-up side of the drum by the constant speed sprocket without interference with the film loop from the driving sprocket to the feed side of the drum for either direction of travel of the film.

In the arrangement of elements in accordance with the invention, the constant speed sprocket is disposed between the drum and driving sprocket with its axis lying substantially in a plane including the axes of the drum and driving sprocket. The constant speed sprocket diameter is so chosen that the driving teeth on the periphery thereof lie within the space bounded by two planes each of which is commonly tangent to the drum and driving sprocket, one above and one below the plane including the axes of the drum and driving sprocket. While the drawing discloses the drum diameter as being larger than either sprocket, either the drum diameter or the driving sprocket diameter or both may be larger than the diameter of this constant speed sprocket to maintain the condition set forth.

The invention may be more readily understood by reference to the accompanying drawing in which:

Fig. 1 is an elevation of a recording film driving apparatus showing the method of film threading for forward direction of film travel through this apparatus;

Fig. 2 discloses a negative film bearing a sound track recorded in the apparatus of Fig. 1;

In direct recording of 16 millimeter sound film it is at times desirable to obtain a sound negative which may be given a standard development and a number of positive prints obtained therefrom. At other times it is desirable only to obtain a sound negative from which the positive print may be obtained by reversal development of the negative. As 16 millimeter sound negative film is provided with but one row of sprocket perforations and in the usual recording process is propelled through the recording apparatus always in the same direction, the relative position of the sound track and marginal sprocket perforations will not be the same on the reversal developed positive as on the positive print obtained from the developed negative. This condition will obviously introduce difficulties in the subsequent sound reproduction or processes employed in combining picture and sound on the same film.

This difficulty may be overcome by propelling the recording film through a recording apparatus in one direction, starting from one end of the film roll for a resulting reversal developed positive and in the opposite direction starting from the other end of the film supply roll for a resulting positive printed from a developed negative. In this manner the relative position of the sound track and the marginal film perforation will be the same on each positive print.

In recording sound on film it is essential that the film be driven at uniform speed past the exposure point. Uniform film speed is usually obtained in present sound film recording apparatus by film driving mechanism including a rotatable film supporting drum at the exposure point, a constant speed sprocket engaging the film on the take-up side of the drum, and a feed and take-up sprocket for drawing the film from the supply reel and feeding the film to the take-up reel. To obtain equal uniform speed of film in either direction of travel through a reversible film driving apparatus, the same sequence of engagement of the film with the driving elements should be realized for either direction of travel of the film, that is, the film should be engaged by the constant speed sprocket on the take-up side of the drum for either direction of film travel. This desirable film engaging sequence cannot be realized with existing sound film driving apparatus because no method of film threading to produce this result can be realized without producing interference between the film loops on the feed and take-up side of the film supporting drum.

Figure 1:
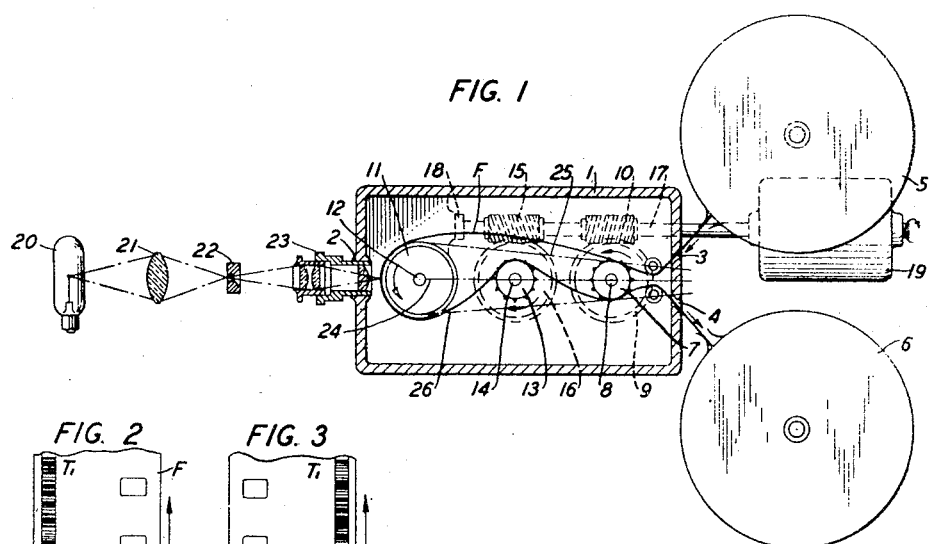

Referring to Fig. 1, the sound film recording apparatus shown therein comprises a housing 1 having an opening 2 for the admission of a recording light beam and openings 3 and 4 for the admission and exit of a recording film F from supply reel 5 to take-up reel 6, respectively. The film F is drawn from supply reel 5 and fed to take-up reel 6 by sprocket 7 mounted on shaft 8. A gear 9 secured to shaft 8 is driven by a worm gear 10. The film is supported at the exposure aperture by a rotatable drum 11. This drum is secured to a shaft 12 which is rotatable in suitable bearings. In the usual construction, an inertia device such as the fly-wheel is secured to this shaft to be rotatable with the film driven drum 11.

A constant speed sprocket 13, mounted on shaft 14 engages and drives the film towards sprocket 7 from the take-up side of drum 11. Sprocket 13 is rotated in a direction opposite to the direction of rotation of sprocket 7 by means of a worm gear 15 in engagement with gear 16. In the usual construction of apparatus of this type the means are provided usually in the form of a resilient coupling between the gear 16 and shaft 14 to insure constant rotational speed of sprocket 13.

The gear 10 for sprocket 7 and the gear 15 for sprocket 13 are mounted on a shaft 17 having one end rotatable in a suitable bearing 18 and the other end coupled to a reversible electric motor 19.

A sound recording optical system includes a constant light source 20, a condenser lens 21, a light valve or other light modulating device 22, and an objective lens unit 23 extending into the recording machine housing at aperture 2.

The constant speed sprocket 13 is disposed between the drum 11 and the sprocket 7 with its axis of rotation (shaft 14) located in the plane indicated by line 24 which includes the axis of rotation (shaft 12) of drum 11 and the axis of rotation (shaft 8) of sprocket 7. The position of the axis of rotation of sprocket 13 in this plane may be different from that shown in the drawing, that is, this sprocket may be placed nearer the sprocket 7 or nearer the drum 11 so long as its diameter is such that the driving teeth on the peripheral surface thereof do not extend beyond planes indicated by lines 25 and 26, each plane being a common tangent to drum 11 and sprocket 17, one above and one below, respectively, the plane indicated by line 24.

Figure 2:
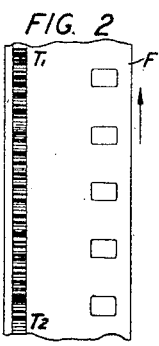

The method of film threading in the direction of travel of the film through the apparatus as shown in Fig. 1 is employed when the resulting positive 16-millimeter sound film is to be obtained by printing from the negative after development. A negative sound film obtained in the apparatus of Fig. 1 is shown in Fig. 2 as viewed from the side bearing the emulsion. The direction of film travel is indicated by the arrow. The direction of sound recording is indicated by the letters T1 to T2.

Figure 3:
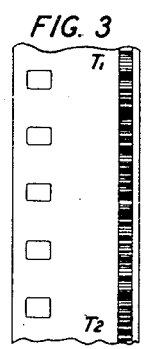
Fig. 3 shows a positive print made from the developed negative film of Fig. 2.

Fig. 3 shows a positive sound film as viewed from the emulsion side which has been printed from the negative of Fig. 2 and in which in the printing operation the emulsion side of the positive faces the emulsion side of the negative.

It will be seen that the relative position of the single row of sprocket holes and the sound track as viewed from the side of the film bearing the emulsion is different from the films of Figs. 2 and 3. Therefore, if in one case the positive of a sound record film recorded in the apparatus of Fig. 1 were to be obtained by a reversal development of the film in Fig. 2 and in another case by a printing operation from the developed negative of Fig. 2, the relative position of the sound track and the marginal sprocket perforation on the two films would be such that one of these films would have to be propelled through a reproducing apparatus with its emulsion side reversed to bring the sound track in registration with the sound reproducing optical system.

Figure 4:
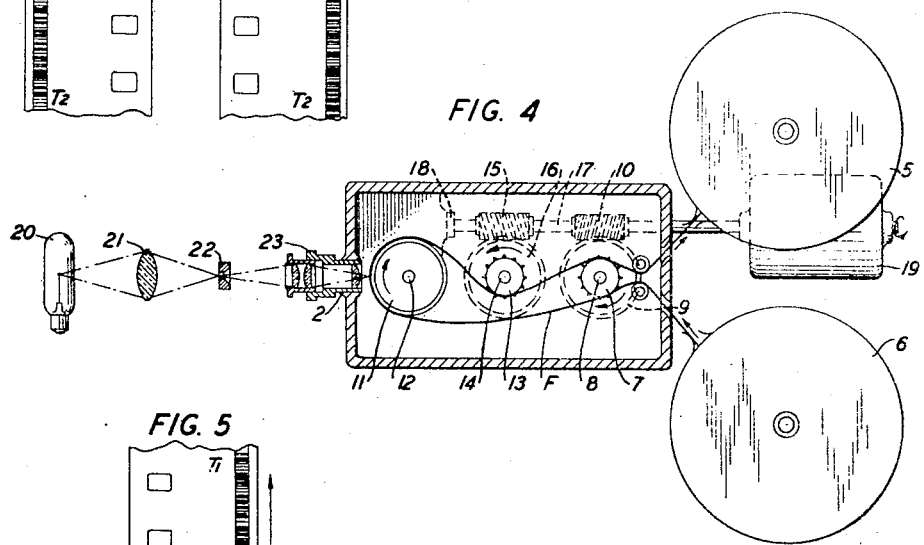
Fig. 4 is an elevation of the apparatus as shown in Fig. 1 showing the method of film threading for reverse direction of film travel through the apparatus.

Fig. 4 discloses the same machine as disclosed in Fig. 1 but with the film threaded over the guiding and driving elements for reverse travel of the film therethrough starting from the opposite end of the film roll so that the emulsion side of the recording film is presented to the light beam as before and the non-perforated marginal edge of the film passes through the recording light beam. The same sequence of film engagement with the guiding and driving elements is obtained for either direction of travel, that is, the film path for either direction extends from the feed side of sprocket 7 to drum 11, thence over the side of sprocket 13 adjacent the film path sprocket 7 to drum 11, and thence to the take-up side of sprocket 7. The film between the feed side of sprocket 7 and drum 11 in each case is clear of any interference from the sprocket 13 or the film loop engaged thereby on the take-up side of the drum.

Figure 5:
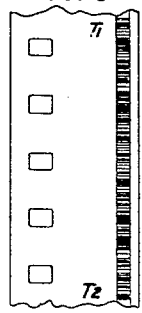
Fig. 5 discloses a reversal developed positive of a negative bearing a sound track recorded thereon in the apparatus as disclosed in Fig. 4.

Fig. 5 discloses a positive 16-millimeter sound film as viewed from the emulsion side thereof as obtained by a reversal development of the negative obtained in the recorder of Fig. 4. It will be noted that the relative position of the sound track and the marginal perforation is the same in both the positive sound films shown in Fig. 3 and Fig. 5.

By means of the machine described herein and with a knowledge of the type of development to be subsequently employed in obtaining a positive, the direction of travel through the machine may be chosen so that there will result a positive in which the sound track will be in the correct relative position to the marginal sprocket perforations. By reason of the uniformity in film speed obtainable in the recording machine disclosed herein, efficient uniform sound recording on each record is assured regardless of its direction of travel through the apparatus.

What is claimed is:

1. In a driving apparatus for propelling a film strip past an exposure point, a pair of film magazines, a driving sprocket for drawing said film strip from one of said magazines and feeding said film strip to the other of said magazines, a rotatable support engaging said film adjacent an exposure point, a second sprocket disposed between said first sprocket and said rotatable support with its axis substantially in alignment with the axes of said support and said first sprocket, driving means producing rotation of said sprockets in opposite directions, said driving means being reversible to reverse the direction of rotation of said sprockets, the film path for either direction of operation extending from one side of said film sprocket to said support, thence over a side of said second sprocket adjacent the film path from said first sprocket to said support, and thence to the other side of said first sprocket, whereby said film strip is in driving engagement with said second sprocket on the take-up side of said rotatable support for either direction of travel of said film strip through said apparatus.

2. In a film recorder driving apparatus for propelling a recording film strip past an exposure point with equal uniform speed in either forward or reverse direction of travel through said apparatus, a rotatable film supporting drum at said exposure point, a first sprocket for feeding said film to and drawing said film from said drum, a second sprocket, driving means for producing rotation of said sprockets in opposite directions, said driving means being reversible to reverse the direction of rotation of said sprockets, said second sprocket disposed between said drum and said first sprocket with its opposed peripheral surfaces located between two planes each of which is a common tangent to said drum and said first sprocket, one above and one below a plane including the axes of said drum and first sprocket, whereby said film strip may be engaged and driven in the proper direction by said second sprocket from the take-up side of said drum in either direction of rotation without interfering with the free travel of said film strip from said first sprocket to the feed side of said drum.

3. A film driving apparatus for propelling a film strip past an exposure point in two directions with said film strip having the same sequence of engagement with the driving elements of said apparatus for either direction of travel, comprising a rotatable film supporting drum, a first sprocket for feeding said film to and drawing said film from said drum, a constant speed sprocket, means for driving said sprockets in opposite directions, said driving means being reversible to reverse the direction of rotation of each of said sprockets, said constant speed sprocket having a diameter smaller than either said drum or said first sprocket and disposed between said drum and said first sprocket with its axis lying substantially in a plane including the axes of said drum and first sprocket whereby said film strip may be engaged and driven in the proper direction by said constant speed sprocket from the take-up side of said drum for either direction of travel of said film through said apparatus.

RICHARD W. BENFER.

REFERENCES CITED

The following references are of record in the file of this patent:

UNITED STATES PATENTS

| Number | Name | Date |
| --- | --- | --- |
| 1,802,595 | De Forest | Apr. 28, 1931 |
| 2,036,584 | Kuppenbender | Apr. 7, 1936 |
| 2,266,755 | Herzig | Dec. 23, 1941 |